United States Patent [19]

Vest

[11] 3,952,405
[45] Apr. 27, 1976

[54] METHOD FOR FABRICATING A LIQUID CRYSTAL DISPLAY

[75] Inventor: Clovis R. Vest, Phoenix, Ariz.

[73] Assignee: Motorola, Inc., Chicago, Ill.

[22] Filed: Nov. 4, 1974

[21] Appl. No.: 520,598

[52] U.S. Cl............................ 29/592; 350/160 LC; 316/17; 29/25.11; 29/25.13; 96/38.4
[51] Int. Cl.² ........................................ G02F 1/13
[58] Field of Search...................... 96/36.2, 38.4, 44; 156/145, 102, 104, 106, 107; 350/160 LC; 29/592, 25.11, 25.13, 203 V; 23/230 LC; 117/211, 212, 38, 66; 53/22 A; 316/17

[56] References Cited
UNITED STATES PATENTS

| | | | |
|---|---|---|---|
| 3,764,429 | 10/1973 | Janning............................ | 316/17 X |
| 3,846,015 | 11/1974 | Moi .............................. | 350/160 LC |
| 3,857,627 | 12/1974 | Harsch.......................... | 350/160 LC |
| 3,860,424 | 1/1975 | Johnson............................ | 96/38.4 |

*Primary Examiner*—C. W. Lanham
*Assistant Examiner*—Dan C. Crane
*Attorney, Agent, or Firm*—Henry T. Olsen; Harry M. Weiss

[57] ABSTRACT

A method for fabricating a liquid crystal display device includes the steps of providing a pair of insulated electrode-carrying plates, depositing on the surface of one of the plates, overlying the electrodes a layer of photopolymeric material approximately 0.0005 inches in thickness, masking and light exposing the photopolymeric layer and thereafter developing a way with a suitable solvent a predetermined area of material to provide a cavity in the photopolymeric layer through which the electrodes on the plate are accessible. On the surface of the second one of the plates whereat the second set of electrodes are located, a layer of photopolymeric material of approximately 0.0005 inches in thickness is deposited by masking and light exposing the second photopolymeric material and thereafter developing away with a suitable solvent, a predetermined area of material which is slightly smaller than the area provided by the first area of material is produced to provide a cavity in the photopolymeric layer through which the electrodes on the second plate are accessible. The first and second electrode-carrying plates are bonded together to seal the edges of the cavity. The cavity is filled with a liquid crystal composition through an aperture provided in the photopolymeric layer on one of the plates and thereafter the hole is sealed to retain the liquid crystal composition in the cavity.

10 Claims, 4 Drawing Figures

METHOD FOR FABRICATING A LIQUID CRYSTAL DISPLAY

RELATED APPLICATION

This application is related to application, Ser. No. 256,028 filed May 23, 1972 by Richard Gurtler and assigned to the same assignee as herein.

BACKGROUND OF THE INVENTION

This invention relates generally to liquid crystal displays and, more particularly, to a method of fabrication thereof.

Liquid crystal display devices conventionally include a pair of spaced insulative plates or sheets, such as glass or the like, upon which electrodes are mounted. A thin liquid crystal film is provided between the spaced plates. By an application of a sufficiently high electric field to the liquid crystal composition, light scattering or twisting occurs, resulting in a contrast effect producing visualization of the activated region. This effect is caused by the interaction of ions and/or twisting of the liquid crystal modules, which are attempting to align in a characteristic way relative to the field.

In the fabrication of the above described display devices, it is critical that the electrodes be separated by a distance on the order of 0.0005 inches and a seal must be applied between the electrode-carrying plate along the outer edges thereof to retain the liquid crystal composition between the plates without contaminating the former. As is disclosed in the above-referred-to application, there is provided therein a method of fabricating liquid crystal devices which includes the utilization of a film of photopolymeric material to both seal and space the electrodes from each other. Since the materials of the liquid crystal display, i.e., the glass plates, the conductive but transparent electrodes, and the insulating seal material, all of relatively transparent material, it has been found difficult to align the first plate with the second plate, in a manner required for proper construction of the device.

SUMMARY OF THE INVENTION

Accordingly, it is an object of the present invention to provide a new and improved method for fabricating liquid crystal display devices which overcomes the drawbacks of the prior art.

A more specific object of the present invention is to provide a new and improved method for fabricating liquid crystal display devices wherein the spacing of the electrode plates and the alignment thereof is accomplished simultaneously.

It is a still further object of the invention to provide a method of the above described type which is relatively simple to carry out and which produces a liquid crystal display device having accurately spaced and aligned electrodes.

The method in accordance with the invention, for fabricating liquid crystal display devices, comprises the steps of providing a first planar insulative electrode mounting plate, deposit on the surface of the first plate on the side thereof including the electrodes a film of photopolymeric material approximately 0.0005 inches in thickness, selectively masking and light exposing the photopolymeric film to remove the latter from a predetermined area substantially at the center of the plate leaving a cavity in the material through which the electrodes on the plate are accessible, providing a second planar insulative electrode mounting plate, depositing on the surface of the second of the plates on the side thereof including the electrodes a film of photopolymeric material substantially 0.0005 inches in thickness, selectively masking and light exposing the photopolymeric film to remove the latter from a predetermined area slightly smaller than the area of the first plate substantially at the center of the plate leaving a cavity in the material through which the electrodes on the plate are accessible, bonding the first and second electrode plates together by the photopolymeric layers by heating under pressure at approximately 150°C, thereby to seal the edges of the cavities, providing an aperture in the photopolymeric layer communicating with the cavity through which the liquid crystal composition may be introduced, for example, by capillary filling under vacuum and sealing the gap thereafter to prevent leakage of the liquid crystal material from the cavity and to protect the liquid crystal from the environment.

THE DRAWINGS

Further objects and advantages of the invention will be understood from the following complete description thereof from the drawings wherein.

COMPLETE DESCRIPTION

Figure 1:
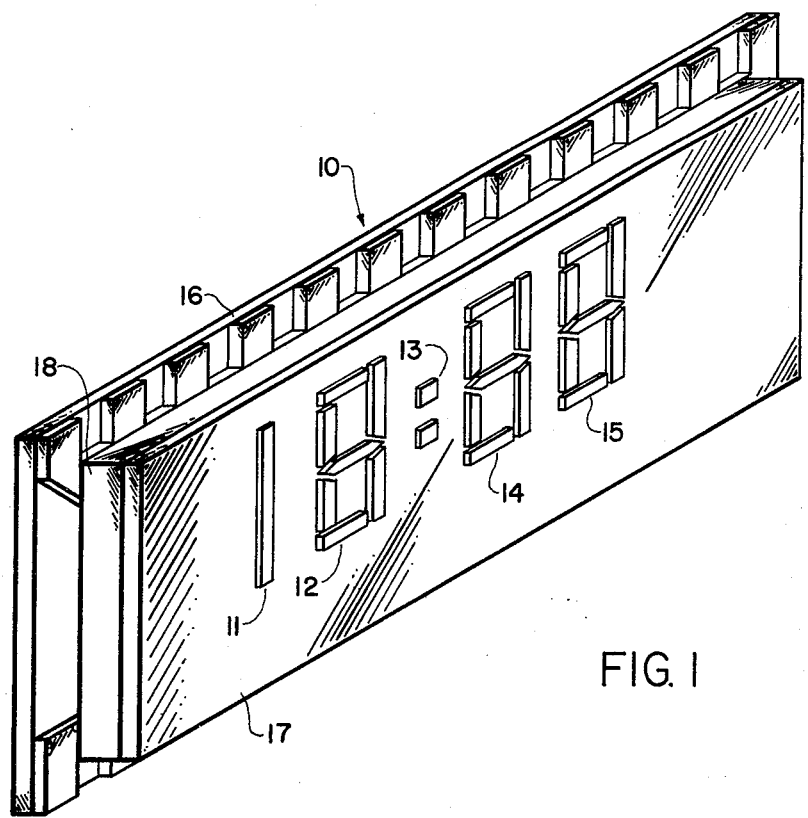
FIG. 1 is a perspective view illustrating a liquid crystal device manufactured in accordance with the invention.

In accordance with the preferred embodiment of the invention, the liquid crystal display 10 illustrated in FIG. 1 is particularly adapted for use in a digital display for an electronic watch, and thus requires only five display characters 11 to 15. Characters 12, 14 and 15 are each seven segment numeric displays capable of being energized to illustrate the numerals 0 to 9, while the character 11 merely indicates the numeral 1 and the character 13 illustrates a colon. Thus, the display is capable of illustrating every hour and minute of the day, or alternately, the month and day of the year. It will be appreciated that the particular display may be modified to include further characters, for example, to illustrate the seconds or further, the calendar year. Also, the display may be adapted for use in other functions other than in an electronic watch.

The liquid crystal display basically comprises a first electrode-carrying plate 16 and a second electrode-carrying plate 17 secured together by a spacer member 18 to form a liquid crystal material containing a cavity therebetween. The liquid crystal material may be selected from any number of suitable materials, such as illustrated in the aforementioned related application and referred to therein.

Figure 2:
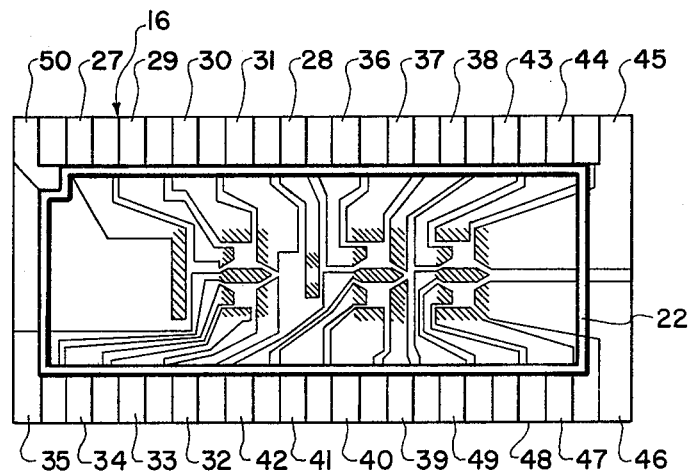
FIG. 2 is a plan view of the first of the electrode-carrying plates.
Figure 3:
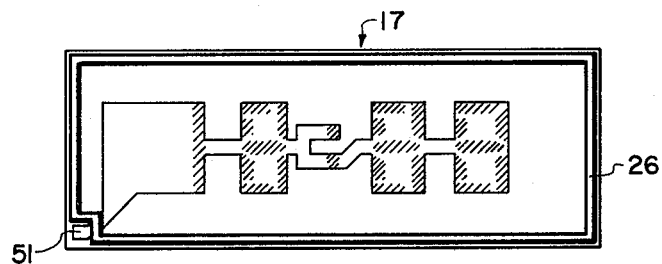
FIG. 3 is a plan view of the second of said electrode-carrying plates.
Figure 4:
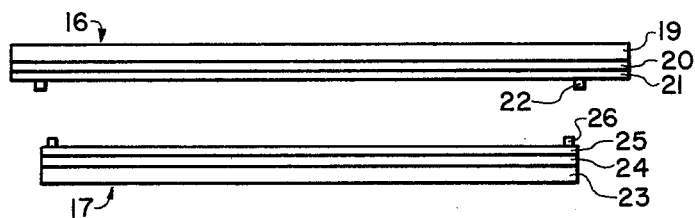
FIG. 4 is a side elevation view indicating the two plates in readiness for assembly in accordance with the invention.

A plan view of the electrode-carrying plate 16 and electrode-carrying plate 17 are more particularly illustrated in FIGS. 2 and 3, respectively, while cross-sections thereof are illustrated in FIG. 4. In cross-section, the electrode-carrying plate 16 includes a transparent insulative plate 19, a configured conductive electrode layer 20, an insulative layer 21, for example, of silicon dioxide, and a sealing member 22. Similarly, the electrode-carrying plate 17 includes insulative member 23, conductive member 24, insulative member 25 and sealing member 26. It will be appreciated that the relative thickness of the layers and the configurations are for illustration purposes only, and are not intended to be in their proper configuration or proportion.

As illustrated in FIG. 2, the conductive layer 20, upon insulative plate 19, is configured into a large number of separate electrode members. Electrode members 27 and 28 form part of the characters 11 and 13, respectively. Electrode members 29 to 35 are the electrodes for the seven segment element 12. Electrodes 36 to 42 are the seven segments of the character 14, while electrodes 43 to 49 form the electrodes for the character 15. The conductive layer 24 on plate 23 is configured as illustrated in FIG. 3 into a single multi-segmented electrode, which coacts with the electrodes on carrying plate 16 in a manner to designate the various characters in a manner shown by the shading in each of the Figures.

Each of the electrode-carrying plates is prepared by similar processing utilizing a complementary set of masks. Thus, the electrodes which may be composed of indium oxide or other suitable material, is deposited on the surface of the plates as by sputtering and then etched to form the desired configuration for the electrodes. Over the configured electrodes, there is deposited, as by sputtering or evaporation, a silicon dioxide insulative layer. Over the insulative layer there is deposited an insulative photopolymeric material. Such materials are comprised commonly of one of a group of polyesters with photosensitizers added. An example of such photopolymeric material is identified by the trade name RISTON.

The layer of photopolymeric material is of a predetermined thickness, approximately 0.0005 inches. This thickness is required to properly space the electrodes on the two plates of the liquid crystal display from those on a second plate. The deposition of the photopolymeric material can be accomplished by a laminating technique. Such a technique may be formed by machinery known in the art subsequent to laying down the photopolymeric layer on the surface of the glass, the plate and polymeric layer are baked in an air atmosphere of approximately 150°C to complete the polymerization.

Once the photopolymeric layers are deposited on the electrode-carrying surfaces of the plate members 16, 17, the masks of predetermined complementary shape, which are substantially rectangular except for a right angle 50, 51 placed therein, is placed over the layer. The layer which is light sensitive is then exposed by a light source positioned thereabove. The particular layer 16 of the photopolymeric material illustrated in the drawing is of the "positive" type, i.e., light striking the material causes it to harden so as to resist removal by a suitable developing solution. If the polymeric layer were of the "negative" type, the light struck portion of the layer would become developer sensitive and would be made soluble (removable) in the developer solution.

Once the layers are light exposed, the masks may be removed and a developer solution, such as, for example, butyl acetate is applied thereover. The portion of the layers not light exposed are soluble in a developer solution and the non-light struck portion washes away, leaving cavities surrounded by sealing layers 22, 26 of polymeric material, the width of which is on the order of 0.02 to 0.06 inches. The use of complementary masks makes these sealing layers or rings complementary to each other, i.e., one fits exactly within the other. An opening (not shown) may be formed in the complementary rings if desired, as shall be explained in the following. Subsequent to the washing with the developing solution, the photopolymeric layers are rinsed in xylene and/or water to remove any developing solvent therefrom.

Once cavities have been provided in the photopolymeric layers, the two electrodes are prepared for juxtaposition as illustrated in FIG. 4. The right angle notches in the corners thereof providing alignment guides together with the overall complementary ring structures 22, 26, provided thereon. This provides a ready alignment of the two plates into the overall lapping complementary relationship to provide the complementary electric field for excitation of the liquid crystal material.

After placing the electrode-carrying plate 16 in juxtaposition with the electrode-carrying plate 17 as described, the overall sandwich of material is heated under pressure to approximately 150°C to bond the electrode-carrying plates together with the polymeric material. This polymeric material is heated until it flows so as to seal the edges of the multi-layer structure.

The sandwich may be heated between a pair of pressure plates, the force providing the pressure applied to the top plate and to the bottom plate or one or to the other. Any suitable means for applying pressure and heat as described may be used to bond the electrode-carrying plates to the photopolymeric layer.

Once the glass or insulated layers are sufficiently bonded to the polymeric layer, the proper spacing between the electrode-carrying plates is assured and the structure is sealed at the edges to prevent leakage of the liquid crystal material, which has yet to be introduced into the cavity.

Next, the liquid crystal composition is introduced into the cavity via either an opening previously provided as described or by way of a hypodermic needle which punctures the sealing layer. The introduction of the liquid crystal material may be introduced by evacuating the cavity in a suitable chamber and then permitting the liquid crystal to flow by capillary action into the cavity.

Once the cavity is filled with suitable liquid crystal material, the opening is sealed with an epoxy, i.e., additional polyester material, or by ultrasonic means and the liquid crystal display is completed.

The method of fabricating the liquid crystal display device, according to the present invention, provides a relatively simple but effective technique to insure that the electrodes of the completed liquid display device are properly aligned and spaced from each other. Furthermore, the sealing of the edges of the device to prevent leakage of the liquid crystal composition is also insured by bonding of the polymeric material to the insulative electrode-carrying plates. The technique according to the invention accomplishes both the provision of proper spacing, proper alignment and proper sealing of the centrally located cavity of the device to prevent leakage of the liquid crystal material therefrom, silumtaneously in a relatieely simple manner.

While the invention has been described in relation to a preferred embodiment thereof, those skilled in the art will recognize that various changes may be made to suit specific requirements without departing from the scope

What is claimed is:

1. A method for fabricating a liquid crystal display device comprising the steps of providing a pair of insulated electrode-carrying plates, depositing on the surface of one of the plates, overlying the electrodes, a layer of photopolymeric material approximately 0.0005 inches in thickness, masking and light exposing the photopolymeric layer and thereafter developing away with a suitable solvent a predetermined area of material to provide a cavity in the photopolymeric layer through which the electrodes on the plate are accessible, depositing on the surface of the second one of the plates whereat the second set of electrodes are located a layer of photopolymeric material of approximately 0.0005 inches in thickness, masking and light exposing the second photopolymeric material and thereafter developing away with a suitable solvent a predetermined area of material which is slightly smaller than the area provided by the first area of material to provide a cavity in the photopolymeric layer through which the electrodes on the second plate are accessible, bonding the first and second electrode-carrying plates together to seal the edges of the cavity, and filling the cavity with a liquid crystal composition.

2. The method of fabricating a liquid crystal display device as claimed in claim 1 wherein the step of bonding said plates and photopolymeric layer together comprises heating the plates and layer at a predetermined temperature and under a predetermined pressure, sufficient to cause said photopolymeric material to flow at the edges.

3. The method of fabricating a liquid crystal display device as claimed in claim 1 wherein the deposition of said layer of photopolymeric material comprises the steps of:
   laminating the photopolymeric material onto the surface of said plate; and
   baking said plate including said laminate to complete the polymerization of said material.

4. The method of fabricating a liquid crystal diaplay device as claimed in claim 1 wherein the bonding of said plate members to said photopolymeric layer comprises the step of heating the sandwich, under predetermined pressure, to approximately 150°C.

5. The method of fabricating a liquid crystal display device as claimed in claim 1 wherein the development of said photopolymeric layer includes the step of applying a butyl acetate solution to said layer and thereafter rinsing said layer with xylene and water to remove the excess developing solution.

6. A method for fabricating a liquid crystal display device, comprising the steps of providing a first planar insulative electrode mounting plate, depositing on the surface of the first plate on the side thereof including the electrodes a film of photopolymeric material, selectively masking and light exposing the photopolymeric film to remove the latter from a predetermined area substantially at the center of the plate leaving a cavity in the material through which the electrodes on the plate are accessible, providing a second planar insulative electrode mounting plate, depositing on the surface of the second of the plates on the side thereof including the electrodes a film of photopolymeric material, selectively masking and light exposing the photopolymeric film to remove the latter from a predetermined area slightly smaller than the area of the first plate substantially at the center of the plate leaving a cavity in the material through which the electrodes on the plate are accessible, and bonding the first and second electrode plates together by the photopolymeric layers by heating under pressure at approximately 150°C, thereby to seal the edges of the cavities.

7. The method of fabricating a liquid crystal display device as claimed in claim 6 wherein the step of bonding said plates and photopolymeric layer together comprises heating the plates and layer at a predetermined temperature and under a predetermined pressure, sufficient to cause said photopolymeric material to flow at the edges.

8. The method of fabricating a liquid crystal display device as claimed in claim 6 wherein the deposition of said layer of photopolymeric material comprises the steps of:
   laminating the photopolymeric material onto the surface of said plate; and
   baking said plate including said laminate to complete the polymerization of said material.

9. The method of fabricating a liquid crystal display device as claimed in claim 6 wherein the bonding of said plate members to said photopolymeric layer comprises the step of heating the sandwich, under predetermined pressure, to approximately 150°C.

10. The method of fabricating a liquid crystal display device as claimed in claim 6 wherein the development of said photopolymeric layer includes the step of applying a butyl acetate solution to said layer and thereafter rinsing said layer with xylene and water to remove the excess developing solution.

* * * * *